US008274612B2

(12) United States Patent
Wong et al.

(10) Patent No.: US 8,274,612 B2
(45) Date of Patent: Sep. 25, 2012

(54) LCD TELEVISION

(75) Inventors: Shih-Fang Wong, Taipei Hsien (TW); Xin Lu, Shenzhen (CN); Yu-Cui Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 430 days.

(21) Appl. No.: 12/605,361

(22) Filed: Oct. 25, 2009

(65) Prior Publication Data

US 2011/0051011 A1 Mar. 3, 2011

(30) Foreign Application Priority Data

Aug. 31, 2009 (CN) .......................... 2009 1 0306387

(51) Int. Cl.
*H04N 5/66* (2006.01)

(52) U.S. Cl. ........ 348/739; 348/731; 348/794; 348/790; 359/454; 359/458; 359/459

(58) Field of Classification Search .................. 348/790, 348/739, 51, 54, 59, 794; 359/454, 455, 359/458, 459; 349/15
See application file for complete search history.

(56) References Cited

U.S. PATENT DOCUMENTS

| | | | | |
|---|---|---|---|---|
| 2003/0048389 | A1 * | 3/2003 | Alden | 348/739 |
| 2004/0114088 | A1 * | 6/2004 | Murade | 349/155 |
| 2004/0181813 | A1 * | 9/2004 | Ota et al. | 725/131 |
| 2004/0252187 | A1 * | 12/2004 | Alden | 348/51 |
| 2006/0262185 | A1 * | 11/2006 | Cha et al. | 348/51 |
| 2007/0033630 | A1 * | 2/2007 | Reznik et al. | 725/131 |
| 2007/0296874 | A1 * | 12/2007 | Yoshimoto et al. | 348/739 |
| 2008/0106595 | A1 * | 5/2008 | Yamane et al. | 348/59 |
| 2009/0002268 | A1 * | 1/2009 | Ueta et al. | 345/7 |

* cited by examiner

*Primary Examiner* — Jefferey Harold
*Assistant Examiner* — Humam Satti
(74) *Attorney, Agent, or Firm* — Altis Law Group, Inc.

(57) ABSTRACT

An LCD television includes an LCD panel including a plurality of LCD units with concave structure, three sides of the LCD unit also include liquid crystal molecule (LCM), all of the first side of the LCD unit constitutes a first LCM array and forms a first display interface, all of the second side of the LCD unit constitutes a second LCM array and forms a second display interface, all of the third side of the LCD unit constitutes a third LCM array and forms a third display interface. The LCD television also includes three signal conversion modules configured to convert three TV program signals into three control signals respectively, three driving modules are configured to drive the three LCM arrays according to the control signals and cause the first display interface, the second display interface, and the third display interface to display corresponding TV programs.

10 Claims, 4 Drawing Sheets

LCD TELEVISION

RELATED APPLICATIONS

This application is related to co-pending application entitled, "LCD PANEL AND DISPLAY DEVICE UTILIZING THE SAME", filed Oct. 25, 2009 Ser. No. 12/605,362.

BACKGROUND

1. Technical Field

The disclosure relates to display devices and, particularly, to an LCD television.

2. Description of Related Art

Liquid crystal display (LCD) televisions are commonly used due to low radiation and minimal flickering.

Usually, an LCD television is capable of displaying only a single TV program corresponding to a single program signal at the same time. In a multiple viewer environment, a single television cannot satisfy all viewers. Although picture-in-picture (PIP) technology can display a first TV program on a television display and another TV program in a corner thereof, the TV program displayed in the corner of the display is very small and hard to view.

Therefore, when there is a need to view multiple television programs, a corresponding number of displays are needed, of course with increased cost.

It is beneficial to provide a LCD television overcoming the limitations described.

BRIEF DESCRIPTION OF THE DRAWINGS

The components in the drawings are not necessarily drawn to scale, the emphasis instead being placed upon clearly illustrating the principles of the LCD television. Moreover, in the drawings, like reference numerals designate corresponding parts throughout the several views.

DETAILED DESCRIPTION

Figure 1:
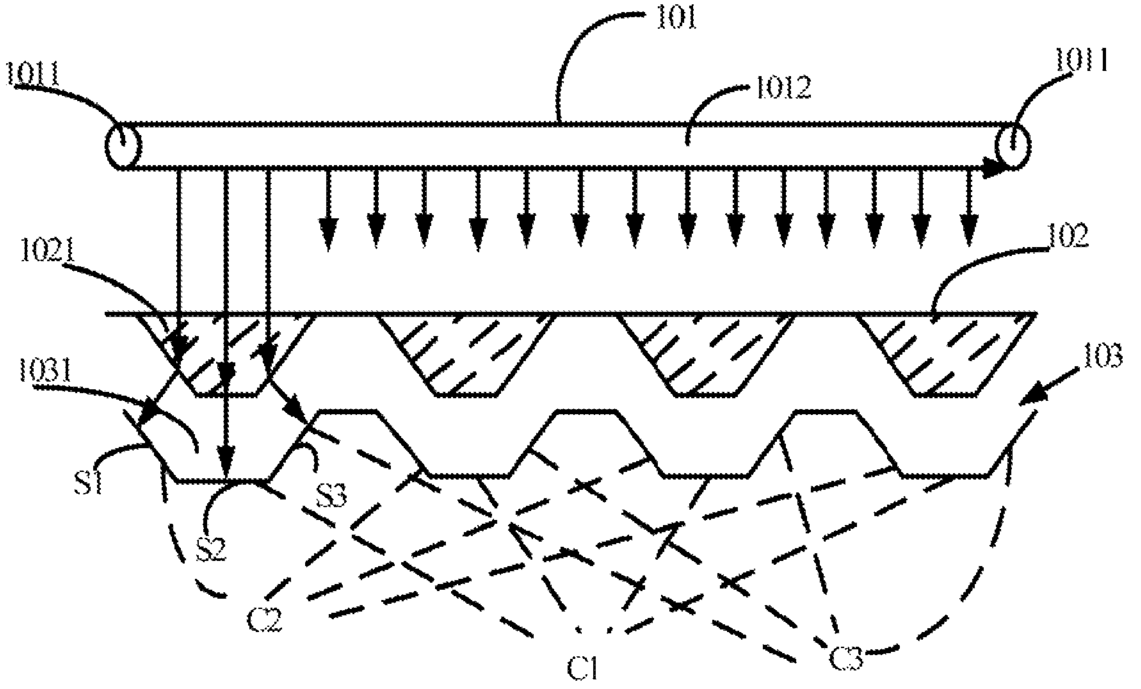
FIG. 1 is a structural diagram of an LCD panel utilized in an LCD television as disclosed.

Referring to FIG. 1, an LCD panel 10 includes a backlight unit 101, a light-guide unit 102, and an LCD array unit 103. The backlight unit 101 is configured to emit light and provide light to the LCD panel 10. The light-guide unit 102 is configured to direct the light emitted by the backlight unit 101 to the LCD array unit 103. In the embodiment, the backlight unit 101 includes a light source 1011 and a reflective panel 1012. The reflective panel 1012 reflects the light emitted by the light source 1011 and directs the light to the light-guide unit 102. The light-guide unit 102 is a transparent panel including a plurality of objects 1021 of trapeziform shape (hereinafter, trapeziform object 1021). The LCD array unit 103 includes a plurality of LCD units 1031 with a concave structure. To more clearly describe the embodiment of the present invention, three sides of one LCD unit 1031 are defined as a first side S1, a second side S2, and a third side S3 respectively. Each LCD unit 1031 corresponds to a trapeziform object 1021 and the three sides of the LCD unit 1031 are parallel to the three surfaces of the trapeziform object 1021, respectively. When light reflected by the reflective panel 1012 reaches the light-guide unit 102, the light-guide unit 102 guides the light upwards to three surfaces of the trapezium object 1021 and directs it to the three sides of the LCD unit 1031, respectively.

Figure 2:
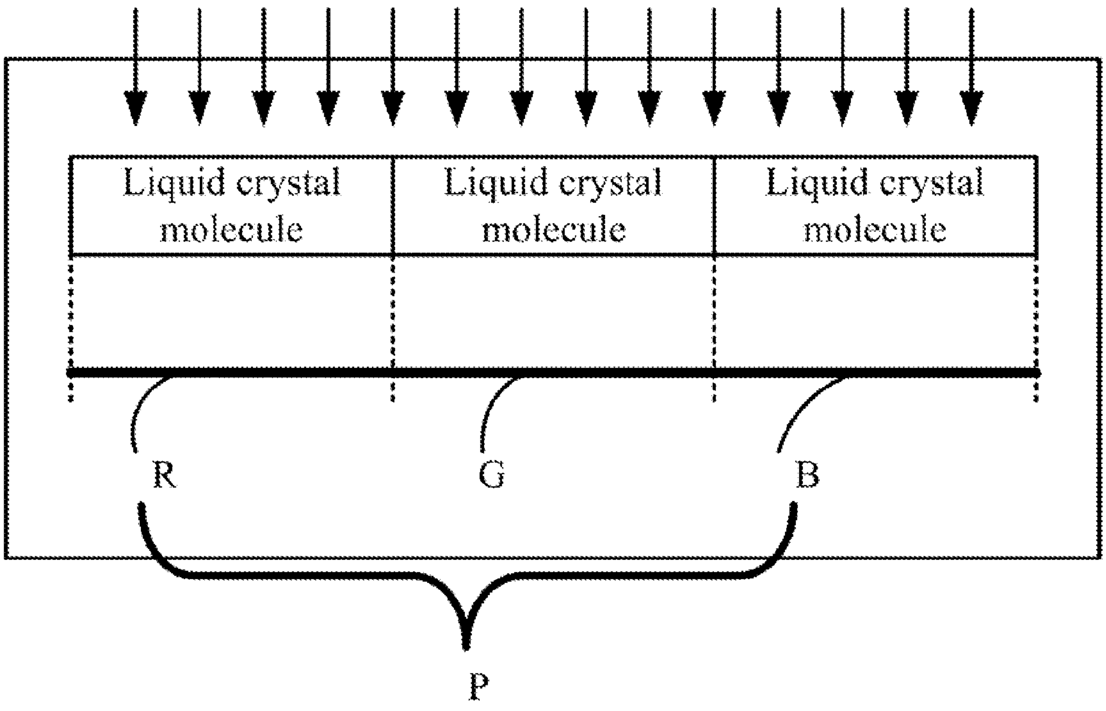
FIG. 2 is a schematic diagram of an LCD unit of the LCD television of FIG. 1.

Referring also to FIG. 2, each of the sides S1, S2, S3 includes three liquid crystal molecules and three filters. The three liquid crystal molecules are between the trapeziform object 1021 and the three filters. In the embodiment, the three filters are red, green, and blue respectively. Light incident on the red filter is filtered and only red is emitted. When light is incident on the green filter, the green filter filters the light and only green is emitted. When light is incident on the blue filter, the blue filter filters the light and only blue is emitted. The three liquid crystal molecules in one side of the LCD unit 1031 correspond to a pixel point P. As described, the light-guide unit 102 guides the light to the first side S1, the second side S2, and the third side S3, and provides them with light. If a liquid crystal molecule is rotated to allow passage of light, the area of the LCD panel 10 corresponds to the liquid crystal molecule displays corresponding color due to filtering function of corresponding filter. If the liquid crystal molecule is rotated and does not allow light through, the area of the LCD panel 10 corresponding to the liquid crystal molecule displays black. Thus, the three liquid crystal molecules compose a certain color and the area of the LCD panel 10 corresponding to the pixel point P displays the resulting color.

Referring to FIG. 1 again, in the embodiment, the liquid crystal molecules of the first side S1 constitute a first liquid crystal molecule array C1, the liquid crystal molecules of the second side S2 constitute a second liquid crystal molecule array C2, and the liquid crystal molecules of the third side S3 constitute a third liquid crystal molecule array C3. Each liquid crystal molecule array is controlled by a unique control module (not shown).

Figure 3:
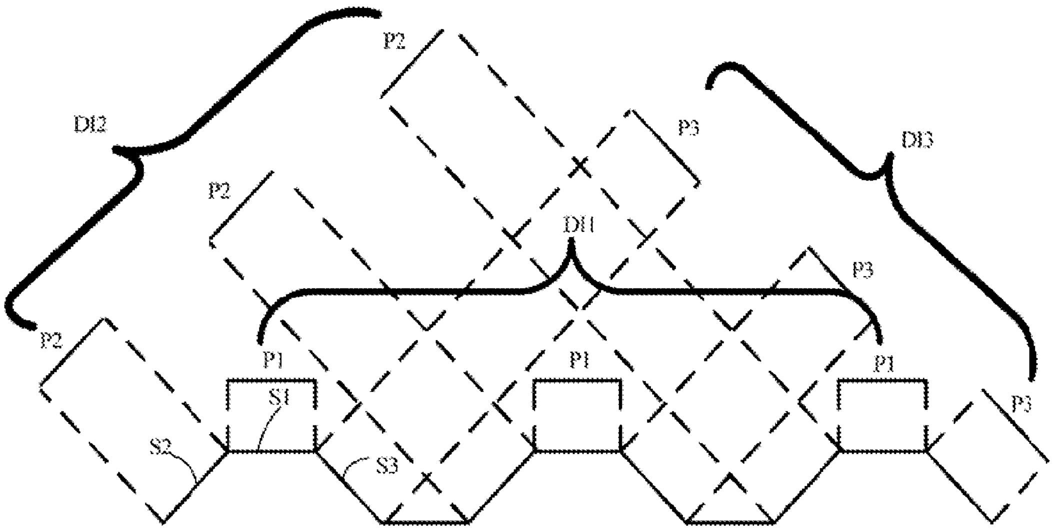
FIG. 3 is a schematic diagram showing a viewing angle of the LCD television of FIG. 1.

Referring also to FIG. 3, each three liquid crystal molecules of the first side S1 constitute a first pixel point P1, each three liquid crystal molecules of the second side S2 constitute a second pixel point P2, and each three liquid crystal molecules of the third side S3 constitute a third pixel point P3 respectively. All of the first pixel points P1 of the first liquid crystal molecule array C1 form a first display interface DI1 to display images visible from a first viewing angle; all of the second pixel points P2 of the second liquid crystal molecule array C2 form a second display interface DI2 to display images visible from a second viewing angle, and all of the third pixel points P3 of the third liquid crystal molecule array C3 form a third display interface DI3 to display images visible from a third viewing angle. In the embodiment, the first viewing angle is the viewing angle from the front, the second viewing angle is the viewing angle from the left, and the third viewing angle is the viewing angle from the right.

Each first pixel point P1 of the first display interface DI1 displays a different color and the first display interface DI1 displays an entire image. As the same, the second display interface DI2, and the third display interface DI3 display an entire image accordingly. In the embodiment, sizes of LCD unit 1031 and the trapeziform object 1021 of the light-guide unit 102 are very small, usually are sized on a nanometric scale, such that, despite blank areas in the first display interface DI1, the image displayed thereon still appears integrated. Similarly, the images respectively displayed by the second display interface DI2 and the third display interface DI3 also appear integrated.

Figure 4:
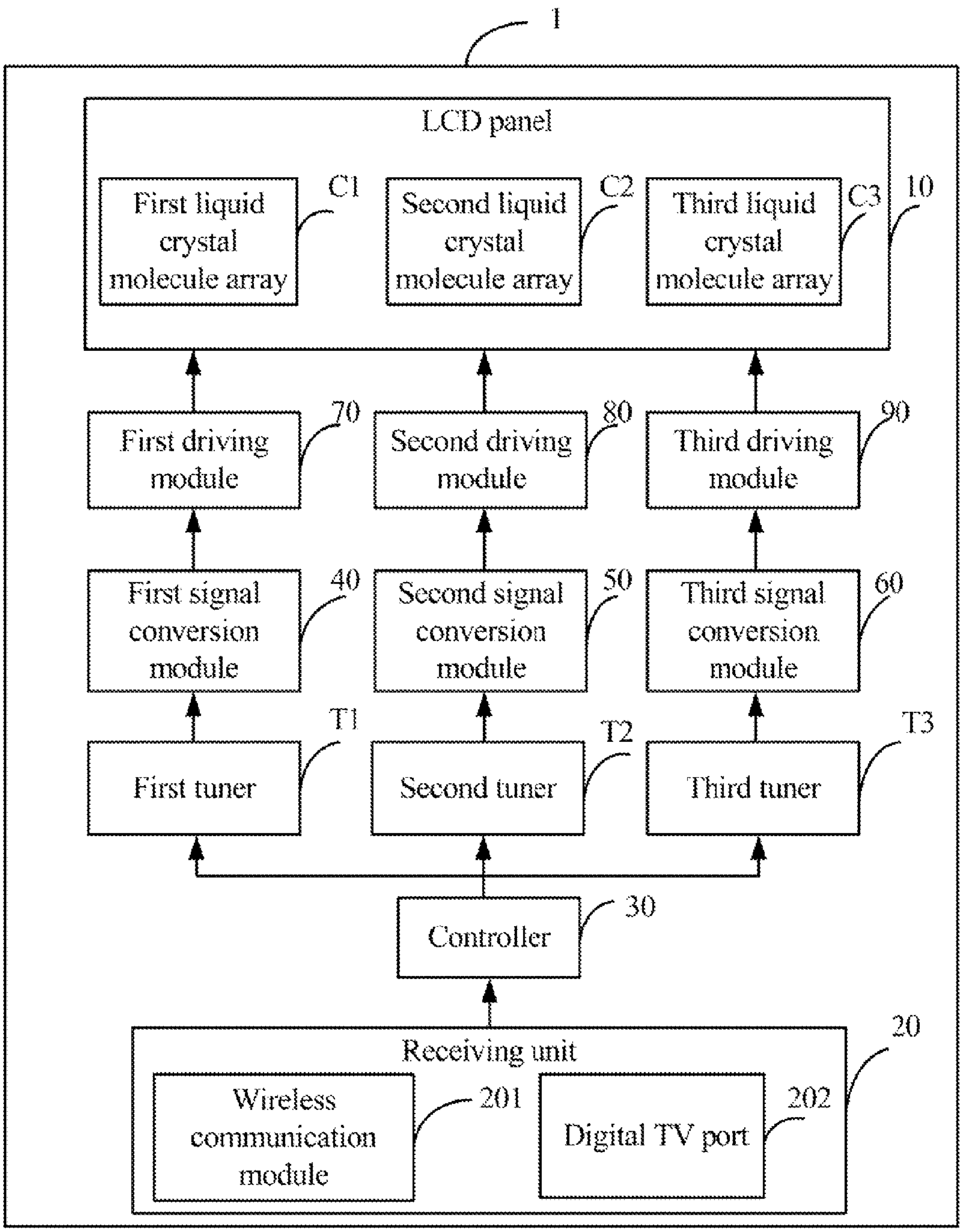
FIG. 4 is a block diagram of an exemplary embodiment of an LCD television as disclosed.

Referring also to FIG. 4. The LCD television 1 includes the LCD panel 10, a receiving unit 20, a first tuner T1, a second tuner T2, a third tuner T3, and a controller 30. The controller 30 is connected between the receiving unit 20 and the three tuners T1, T2, T3, and is configured to choose one of the three to receive TV program signals via the receiving unit 20. For example, the controller 30 can choose the first tuner T1 to receive first TV program signals via the receiving unit 20 or the second tuner T2 to receive second TV program signals via the receiving unit 20, or the third tuner T3 to receive third TV program signals via the receiving unit 20.

The LCD television 1 also includes a first signal conversion module 40, a second signal conversion module 50, a third signal conversion module 60, a first driving module 70, a second driving module 80, and a third driving module 90. The first signal conversion module 40 is connected between the first tuner T1 and the first driving module 70, and is configured to convert the TV program signals received by the first tuner T1 into control signals. The second signal conversion module 50 is connected between the second tuner T2 and the second driving module 80, and is configured to convert the TV program signals received by the second tuner T2 into control signals. The third signal conversion module 60 is connected between the third tuner T3 and the third driving module 70, and is configured to convert the TV program signals received by the third tuner T3 into control signal. The first driving module 70, the second driving module 80, and the third driving module 90 are also connected to the first liquid crystal molecule array C1, the second liquid crystal molecule array C2, and the third liquid crystal molecule array C3 respectively, and direct the liquid crystal molecule of the first liquid crystal molecule array C1, the second liquid crystal molecule array C2, and the third liquid crystal molecule array C3 to rotate according to the control signals respectively.

In the embodiment, the controller 30 chooses one of the three tuners to receive TV program signals in a time-sharing mode, namely, the controller 30 chooses the first tuner T1, the second tuner T2, and the third tuner T3 to receive TV program signals respectively at different times. When the first tuner T1 is chosen to receive TV program signals via the receiving unit 20, the first signal conversion module 40 converts the TV program signals into control signals accordingly, the first driving module 70 controls the liquid crystal molecules of the first liquid crystal molecule array C1 to rotate according to the control signals, then the first display interface DI1 displays the TV program corresponding to the TV program signals received by the first tuner T1. Similarly, the second display interface DI2 displays the TV program corresponding to the TV program signals received by the second tuner T2, and the third display interface DI3 displays the TV program corresponding to the TV program signals received by the third tuner T3. Accordingly, the first display interface DI1, the second display interface DI2, and the third display interface DI3 display the TV programs corresponding to the TV program signals respectively. In the embodiment, the first driving module 70, the second driving module 80, and the third driving module 90 are driving electrodes.

In other embodiments, the controller 30 can choose only two tuners to receive the TV program signals via the receiving unit 20 in time-sharing mode. Alternatively, the controller 30 can choose only one tuner to receive the TV program signals.

In other embodiments, the first signal conversion module 40, the second signal conversion module 50, and the third signal conversion module 60 are embodied in a processing unit converting the display signals from the first tuner T1, the second tuner T2, and the third tuner T3 into control signals in sequence, the first driving module 50, the second driving module 60, and the third driving module 70 direct the liquid crystal molecules of the first liquid crystal molecule array C1, the second liquid crystal molecule array C2, and the third liquid crystal molecule array C3 to rotate when receiving the control signals respectively.

In the embodiment, the LCD television 1 is a digital television, the receiving unit 20 includes a wireless communication module 201 and a digital TV port 202. The wireless communication module 201 is configured to receive the digital TV program signals via wireless mode. The digital television port 202 is configured to receive the digital TV program signals in a wired mode. In the embodiment, the first tuner T1, the second tuner T2, and the third tuner T3 are both digital TV tuners, the first signal conversion module 40, the second signal conversion module 50, and the third signal conversion module 60 are both codecs configured to decode the digital TV program signals received by the first tuner T1, the second tuner T2, and the third tuner T3 to control signals respectively.

Thus, in the disclosure, the LCD television 1 is capable of displaying three different TV programs at the same time. For example, content corresponding to the first TV program signals can be viewed on the front of the LCD television 1, content corresponding to the second TV program signals can be viewed on the left of the LCD television 1, and content corresponding to the third TV program signals can be viewed on the right of the LCD television 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An LCD television comprising:
a receiving unit,
three tuners, configured for receiving TV program signals via the receiving unit;
a controller, connected between the receiving unit and the three tuners, configured for choosing one of the three tuners to receive the TV program signals via the receiving unit;
an LCD panel, comprising:
a backlight unit, configured for providing light for the LCD panel;
a light-guide unit, comprising a plurality of trapezium objects, the trapezium objects configured for guiding the light from the backlight unit to be emitted vertically with respect to three surfaces of the trapezium object;
an LCD array unit, comprising a plurality of LCD units each with concave structure, wherein each LCD unit corresponds to one of the plurality of trapezium objects and comprises a first side, a second side, and a third side, wherein the three sides of the LCD unit are parallel to the three surfaces of the trapezium object respectively, and each side of the LCD unit comprise three liquid crystal molecules and three filters corresponding to the liquid crystal molecules;
wherein three liquid crystal molecules of the first side of all of the LCD units constitute a first liquid crystal molecule array and three liquid crystal molecules of the first side of each of the LCD unit constitutes a first pixel point; three liquid crystal molecules of the second side of all of the LCD unit constitute a second liquid crystal molecule array and three liquid crystal molecules of the second side of each of the LCD unit constitute a second pixel point, three liquid crystal molecules of all of the third side of the LCD unit constitutes a third liquid crystal molecule array and three liquid crystal molecules of the third side of each of the LCD unit constitute a third pixel point, all of the first pixel points form a first display interface, wherein all of the second pixel points form a second display interface, and all of the third pixel points form a third display interface;

a first signal conversion module connected to a first tuner, configured for converting TV program signals received by the first tuner into control signals;

a first driving module, connected between the first signal conversion module and the first liquid crystal molecule array, and configured for driving the first liquid crystal molecule array according to the control signals converted by the first signal conversion module, then the first display interface displays content corresponding to the display signals received by the first tuner;

a second signal conversion module connected to a second tuner, configured for converting the TV program signals received by the second tuner to control signals;

a second driving module, connected between the second signal conversion module and the second liquid crystal molecule array, and configured for driving the second liquid crystal molecule array according the control signals converted by the second signal conversion module, then the second display interface displays content corresponding to the display signals received by the second tuner;

a third signal conversion module connected to a third tuner, configured for converting the TV program signals received by the third tuner to control signals;

a third driving module, connected between the third signal conversion module and the third liquid crystal molecule array, and configured for driving the first liquid crystal molecule array according the control signals converted by the third signal conversion module, then the third display interface displays content corresponding to the display signals received by the third tuner.

2. The LCD television of claim 1, wherein the controller control the three tuners to receive TV program signals in time-sharing mode, the first tuner receives the first TV program signals at all time, the second tuner receives the TV program signals at all time, the third tuner receives the TV program signals at all time.

3. The LCD television of claim 1, wherein the controller controls two of the three tuners to receive TV program signals in time-sharing mode.

4. The LCD television of claim 1, wherein the controller controls one tuner of the three tuners to receive the TV program signals.

5. The LCD television of claim 1, wherein the LCD television is a digital television.

6. The LCD television of claim 5, wherein the receiving unit comprises a wireless communication module and a digital TV port, the wireless communication module is configured to receive digital TV program signals via wireless mode, the digital TV port is configured to receive the digital TV program signals via wired mode.

7. The LCD television of claim 5, wherein the first tuner, the second tuner, and the third tuner both are digital TV tuner, and are configured for receiving the digital TV program signals via the receiving unit.

8. The LCD television of claim 7, wherein the first signal conversion module, the second signal conversion module, and the third signal conversion module are configured for decoding the digital TV program signals received by the first tuner, the second tuner, and the third tuner to control signals respectively.

9. The LCD television of claim 1, wherein the three filters are red, green, and blue respectively; and light emitted via the three surfaces of each trapezium object directly reach the first side, the second side, and the third side of each LCD unit, respectively, and when a liquid crystal molecule of one side of the LCD unit is rotated and light is emitted, the area corresponds to the liquid crystal molecule display corresponding color due to the filtering function of the filter corresponding to the liquid crystal molecule, and when the liquid crystal molecule is rotated and no light is emitted, the area corresponding to the liquid crystal molecule displays black.

10. The LCD television claim 9, wherein the LCD units and the trapezium objects are sized on a nanometric scale.

* * * * *